April 29, 1969 — C. L. FARRAND — 3,441,888
MULTI-LAYER WINDINGS FOR POSITION MEASURING TRANSFORMERS
Filed Oct. 3, 1966

CLAIR L. FARRAND
INVENTOR.

BY W. E. Beatty
ATTORNEY

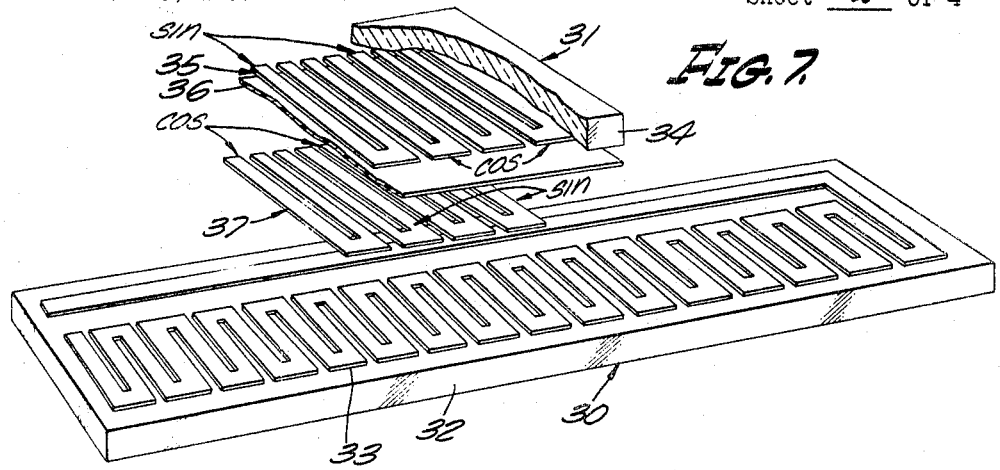
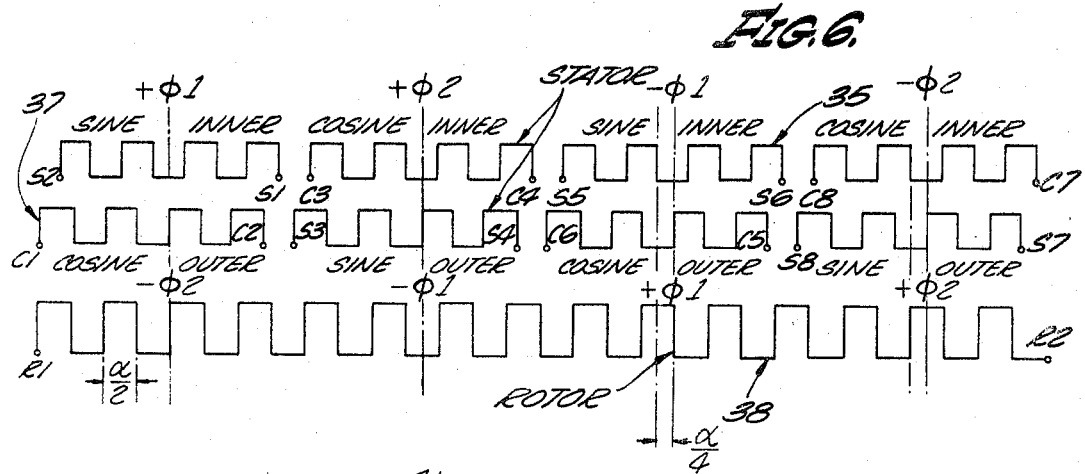
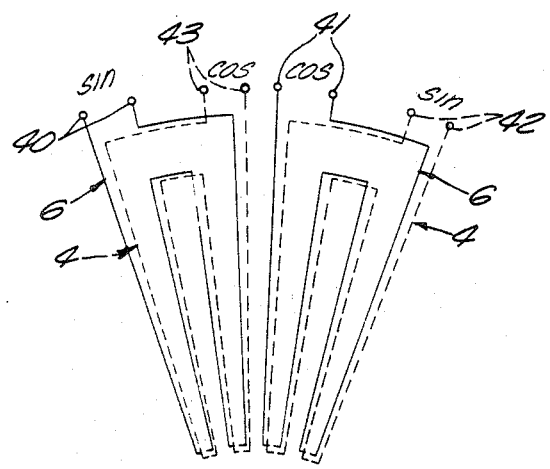
CLAIRE L. FARRAND
INVENTOR.
BY W E Beatty
ATTORNEY April 29, 1969     C. L. FARRAND     3,441,888
MULTI-LAYER WINDINGS FOR POSITION MEASURING TRANSFORMERS
Filed Oct. 3, 1966     Sheet 3 of 4
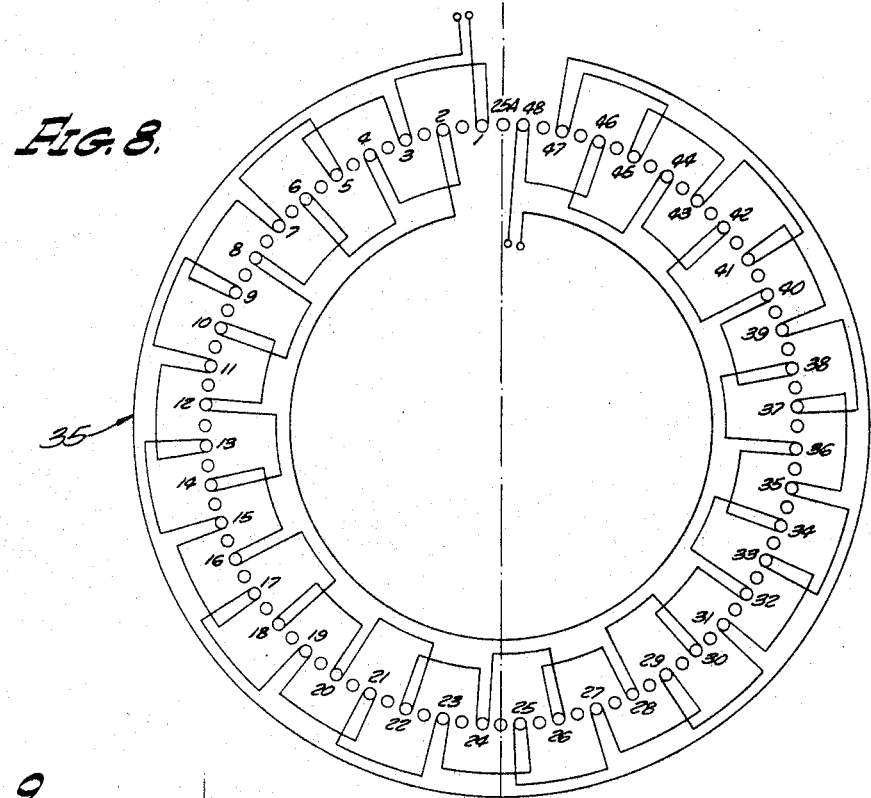
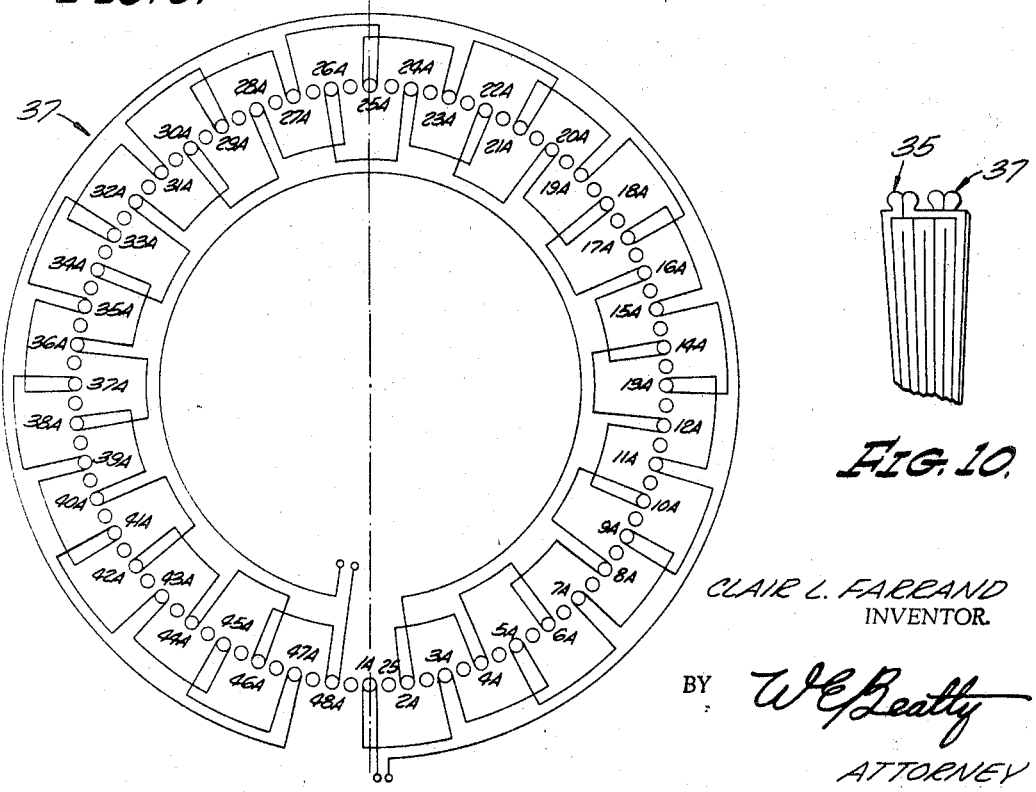
CLAIR L. FARRAND
INVENTOR.
BY W. E. Beatty
ATTORNEY April 29, 1969     C. L. FARRAND     3,441,888
MULTI-LAYER WINDINGS FOR POSITION MEASURING TRANSFORMERS
Filed Oct. 3, 1966     Sheet 4 of 4

CLAIR L. FARRAND
INVENTOR.

BY W. E. Beatty
ATTORNEY

United States Patent Office 3,441,888
Patented Apr. 29, 1969

3,441,888
MULTI-LAYER WINDINGS FOR POSITION
MEASURING TRANSFORMERS
Clair L. Farrand, Bronxville, N.Y., assignor to Inductosyn Corporation, Carson City, Nev., a corporation of Nevada
Filed Oct. 3, 1966, Ser. No. 589,166
Int. Cl. H01f 21/04
U.S. Cl. 336—123                                              23 Claims

ABSTRACT OF THE DISCLOSURE

The invention provides relatively movable transformer members, one member having a plurality of arrays of cofunction windings, wherein the arrays in one form of the invention are arranged in juxtaposition in multilayers, and in another form of the invention are arranged laterally disposed from each other in a single layer. Each layer or array comprises a plurality of staggered groups of windings having a cofunction significance, with the windings of one significance of each array or layer arranged in the gaps of the group of the associated significance. The groups of one layer are opposite the groups of other significance in the other layer and the opposite groups of the layers are noninductively related to each other. Each cofunction significance, such as sine or cosine, of all of the layers as a whole present substantially the appearance of a continuous winding in a direction facing the other transformer member.

---

The invention relates to multi-layer windings for position measuring transformers and has for an object to provide position measuring transformers, either rotary or linear, having a greater accuracy of angular or linear displacements than available heretofore.

A further object of this invention is to provide multilayer windings of printed circuit nature for position measuring transformers which are capable of producing magnetic polar configurations, not possible in a single layer structure, for the purpose of reducing the errors incident to this type of transformer and resulting in a more perfect sinusoidal coupling wave.

A further object of this invention is to provide a position measuring transformer having polyphase planar windings on both movable and stationary members.

The invention provides a plurality of arrays of cofunction windings, wherein the arrays in one form of the invention are arranged in juxtaposition in the form of multi-layers, and in another form of the invention are arranged laterally disposed from each other in a single layer.

FIG. 5 is a wiring diagram showing the relation of superposed sections of the layers of winding, the eight conductors per section, or segment of FIGS. 2 and 3 being represented in FIG. 5 as four conductors per section, or segment.

FIG. 6 is a developed wiring diagram of the rotary form in FIGS. 1–4, but applies equally to the linear form in FIG. 7, showing the arrangements of the connections of the layers of windings.

FIG. 7 is an exploded perspective view showing a linear position measuring transformer of this invention.

FIGS. 8 and 9 show the connections of the several sectors of the two layers of windings for the illustrated 360-pole rotary position measuring transformer.

FIG. 8 shows the connections of the inner stator, the sectors not shown.

FIG. 9 shows the connections of the outer stator.

FIG. 10 is a view of the printed terminals of sectors of the respective layers.

Referring to the drawings—

Figure 1:
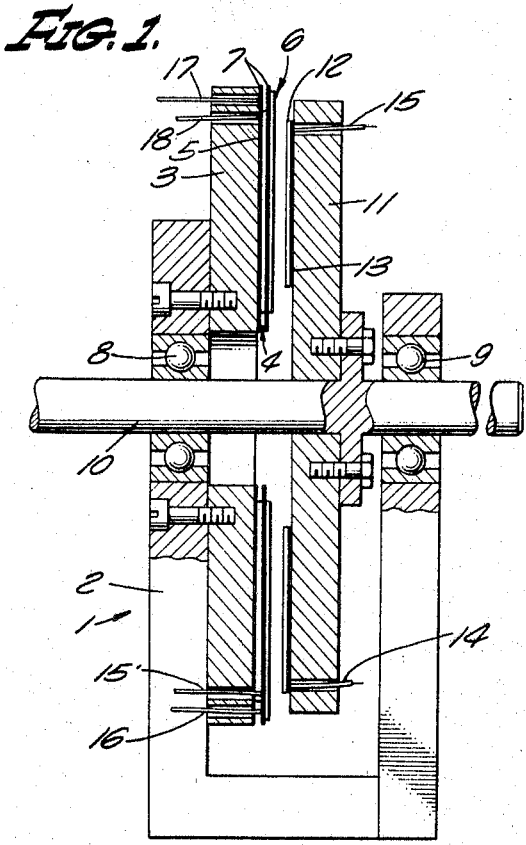
FIG. 1 is a vertical sectional view showing a rotary position measuring transformer of the present invention.

The rotary position measuring transformer 1 employs the feature of this invention with a frame 2 supporting a stator base member 3 on which is mounted a layer 4 of conductors and insulated from base members 3 by a layer of bonding plastic material 5.

Figure 2:
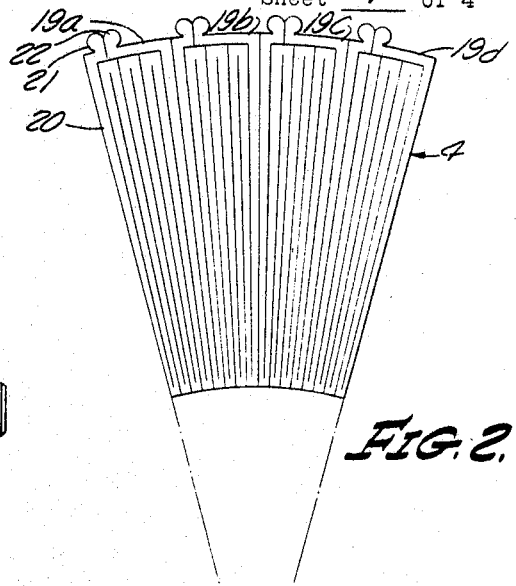
FIG. 2 is a plan view showing schematically a section of one layer of windings for one member of the rotary position measuring transformer.

These conductors of layer 4 are of the configuration shown in fragment in FIG. 2. On the layer 4 of conductors is mounted a second layer 6 of conductors of the configuration shown in fragment in FIG. 3. The conductors of layer 6 are insulated by a bonding plastic layer 7 and are in juxtaposition with the conductors of the first layer 4, as will be described later.

The frame 2 contains bearings 8, 9, which support a shaft 10 on which is mounted a rotor base member 11, on which is mounted a rotor winding 38 in the form of a layer 12 of conductors insulated from the base member by a bonding plastic layer 13, with two terminal connections to the rotor conductors 14 and 15.

The layers 4 and 6 of conductors and the layer 12 of conductors are circumferentially complete.

The two terminal connections for the layer 4 of conductors adjacent to the stator base member 4 are shown at 15', 16 in FIG. 1. The two terminal connections for the layer 6 of conductors superposed on the first layer 4 of conductors are shown at 17, 18, FIG. 1. The layer 12 of rotor conductors is spaced from the stator conductors of top layer 6 by a small air gap of the order of .01 inch.

FIG. 2 is a fragment of the annulus of stator conductors of layer 4, shown as four segments, 19a, b, c, d, of a total of 48 segments. Each segment, like 19a, comprises eight radial bars, as shown at 20, and connected in series and having terminal connections like 21, 22.

Figure 3:
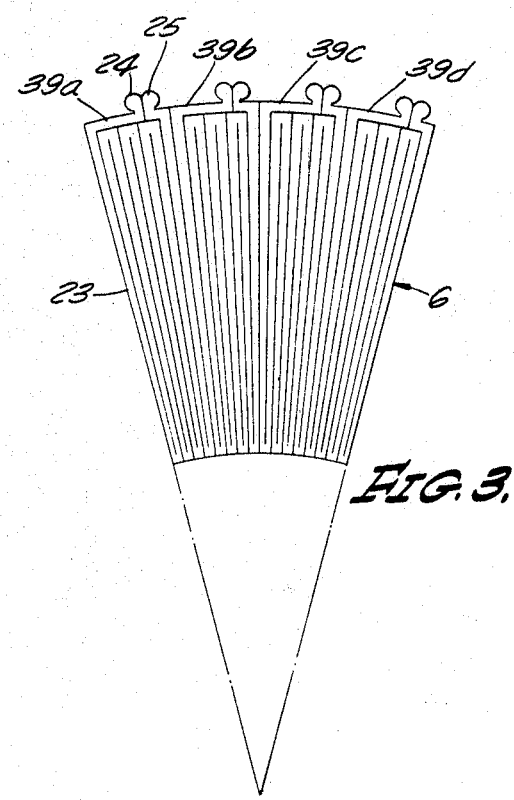
FIG. 3 is a plan view showing schematically a section of another layer of winding for the same member of the rotary position measuring transformer.

FIG. 3 is a fragment of the annulus of stator conductors of layer 6 similar to those of conductors of layer 4, with bars 23 similar to bars 20 of conductors 4. As in FIG. 2, this shows four segments indicated at 39a–d of a total of 48 segments, each segment having 8 radial bars, as indicated at 23.

The terminal connections 24, 25, are displaced from terminals 21, 22 of the conductors of FIG. 2, so that when the two layers are in juxtaposition, the terminals of one layer like 4 will not obscure the terminals of the other layer like 6.

Figure 4:
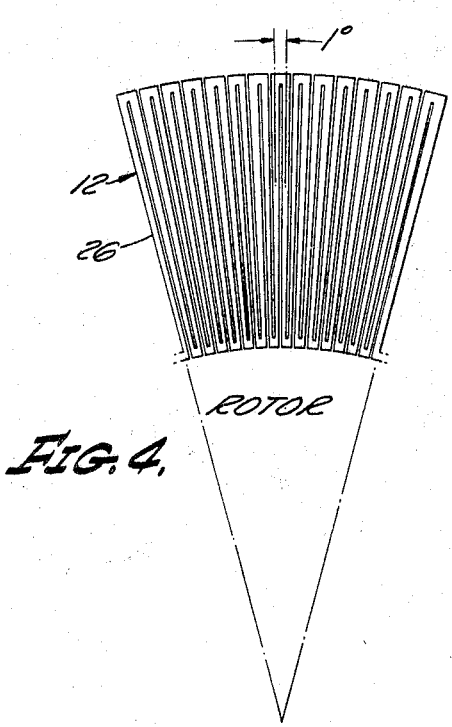
FIG. 4 is a plan view showing a section of the winding for the other member of the position measuring transformer.

FIG. 4 is a fragment of the annulus of layer 12 of rotor conductors comprising, in this instance, three hundred and sixty bars, indicated at 26, having a radial length substantially less than bars 20 and 23. A single phase winding is shown but this may be, alternatively, a polyphase winding similar to that of FIGS. 2 and 3.

FIG. 5 shows schematically two sectors, 40, 41, of one annulus of stator conductors and two sectors, 42, 43, of another annulus of stator conductors where the conductors of layer 4 of sections 42, 43 next to base 3 are shown in dotted line and the superposed conductors of layer 6 of sections 40, 41 are shown in solid line.

Alternate sectors of each of the respective layers 4 and 6 are connected as the sine winding, and adjacent alternate sectors are connected as the cosine winding as described in U.S. Patent No. 2,799,835.

FIG. 6 shows schematically the connections of the sine and cosine windings of the two layers of stator conductors, the inner layer being indicated at 35, as appears in FIG. 7, the outer layer being indicated at 37. In the example illustrated, the rotor has 360 poles, each stator winding having 384 poles, each winding arranged in 48 sectors of 8 poles each.

Twenty-four sectors are connected in series for each of the two phase windings, the sine sectors being interdigitated with the cosine sectors.

The sine sector of one layer is in juxtaposition with the gap between adjacent sine sectors of the other layer; namely, in juxtaposition with the cosine sector of the other layer whereby the sine windings of all layers as a whole present substantially the appearance of a continuous winding in a direction facing the rotor winding.

The windings of the inner and outer layers 35 and 37 of FIG. 6 are substantially noninductively related to each other as hereinafter described.

Referring to FIG. 6, the sine windings of layers 35 and 37 are connected as follows:

S2 of inner layer 35 to S3 of the offset sine winding of outer layer 37; S4 of outer layer 37 to S5 of inner layer 35; S6 of inner layer 35 to S7 of outer layer 37; S1 and S8 being terminals.

The cosine windings are connected as follows:

C2 of outer layer 37 to C3 of the offset cosine winding of inner layer 35; C4 of inner layer 35 to C5 of outer layer 37; C6 of outer layer 37 to C7 of inner layer 35; C1 and C8 being terminals.

With the rotor in position shown in FIG. 6, the sine windings of layers 35 and 37 are nulled to the rotor winding 38. The stator windings are shown in nulled relation but may be in position of maximum coupling to each other. The cosine windings are shown aiding and at substantially maximum coupling to the rotor.

In the arrangement shown in U.S. Patent No. 2,799,835, the sine and cosine windings are not respectively continuous due to their interdigitation.

By the present invention, this condition is avoided, as the sine and cosine windings are effectively continuous because of the interconnection of the windings of the two layers 35 and 37, as shown and described in connection with FIG. 6.

In the former arrangement, an anomaly of the rotor winding would produce a modulated error signal proportional to the frequency of the distribution of the sectors; i.e., in this case, 24 or 48 cycles. By this invention, the error signal is substantially eliminated.

By filling in the space between the sine sectors, for example, with the sine sectors of the adjacent layer, the modulation frequency of the error signal is changed from a high amplitude low frequency signal to a low amplitude high frequency signal. While the windings have been shown in "inner" and "outer" layers, it is to be understood that they may be placed in either layer as long as the described connections are maintained. For example, the winding between terminals S3 and S4 could be in the inner layer and the winding between terminals C3 and C4 could be in the outer layer, as well as any other windings.

It is desirable that there be a minimum of coupling between the sine and cosine windings. The reduction of coupling between the complete sine winding composed of the sine sectors of the two layers with the complete cosine winding composed of the cosine sectors of the two layers is accomplished by their connection as shown in FIG. 6 and described. The sine sector windings are connected additively and in quadrature to the cosine windings and the cosine sector windings are connected additively and in quadrature to the sine windings. Since they are spaced in quadrature relation with each other, no coupling exists between them. Further, if the stator windings of the first layer are a duplicate of those of the second layer and their respective sine and cosine windings are only in approximate quadrature, by juxtaposing the layers with sine sectors over cosine sectors and connecting all sine sectors together and all cosine sectors together, they provide one complete sine winding and one complete cosine winding in exact quadrature.

Tests of a rotary position measuring transformer, embodying the invention, show an improvement of four to one over the prior device.

While this invention has been described in connection with multilayer polyphase quadrature groups of windings, it is understood that these windings may be of other numbers of phases, sectors and bars and disposed on either or both relatively movable members of the position measuring transformer.

In FIG. 7, the invention is illustrated as applied to a linear positioning transformer which comprises a scale 30, generally of the type disclosed in U.S. Patent No. 2,799,835 and a slider 31 generally of the type disclosed in U.S. Patent No. 2,915,722. The scale 30 has a base 32 of metal or other material, on which is bonded by an insulating material, not shown, a series of electrical conductors 33.

Adjacent to this in sliding arrangement and spaced by an air gap is a slider 31 comprising a base 34 of metal or other material, to which is bonded with an insulating material, not shown, a layer of conductors 35 of the type shown in the above-mentioned U.S. Patent 2,915,722.

To this layer of conductors, a similar layer 37 of conductors is bonded by an insulating layer 36. Each pair of conductor bars or U's is similar to one sector of the rotary windings and the U's are connected in the same manner, as explained in FIG. 6. The U-shaped conductor portion is the subject of U.S. Patent No. 3,064,218.

In both the linear and rotary forms, the conductor base may be of metal or magnetic material as described and claimed in U.S. Patent No. 3,202,948.

While the positioning measuring transformer described herein is of the two-phase type where the windings are in quadrature, it is understood that the invention is applicable to other polyphase arrangements of windings.

In many applications, it is desirable to have sine and cosine windings on both the stationary and movable members. This is accomplished, in accordance with this invention, by applying the multi-layer windings of FIGS. 2, 3, 5, and 6 to both members 3 and 11 of the rotary transformer of FIG. 1 and, alternatively, to members 30 and 31 of the linear positioning transformer of FIG. 7. In each case, rotary and linear, the position measuring transformer has sine and cosine windings on one member which are not magnetically coupled to each other, and sine and cosine windings on the other relatively movable member which are not coupled to each other, and the windings of the members are magnetically coupled in movable relation.

Referring to FIG. 8, the wiring of the connections to each of the 48 sectors of the inner winding 35 are shown from the face of the member opposite the windings, the connections to each sector going through the indicated holes in the member.

Likewise, in FIG. 9, the connections for the sectors of winding 37 are similarly shown.

Referring to FIG. 10, where the sectors of the windings 35 and 37 are shown in juxtaposed relation, it is understood that the insulating layer over the terminals of the inner winding has been removed to permit connection.

Figure 12:
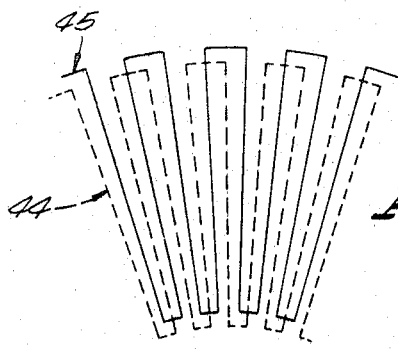
FIG. 12 is a modification showing two rotor windings.

In FIG. 12 are shown two rotor windings, to be used with a two-phase stator winding, for a two-phase transformer in juxtaposed position. The inner winding 45 is shown with the outer winding 44 in juxtaposition with the inner winding and these windings are displaced, in the illustrated example of 360 poles, by ½ degree to provide a quadrature relation.

Figure 11:
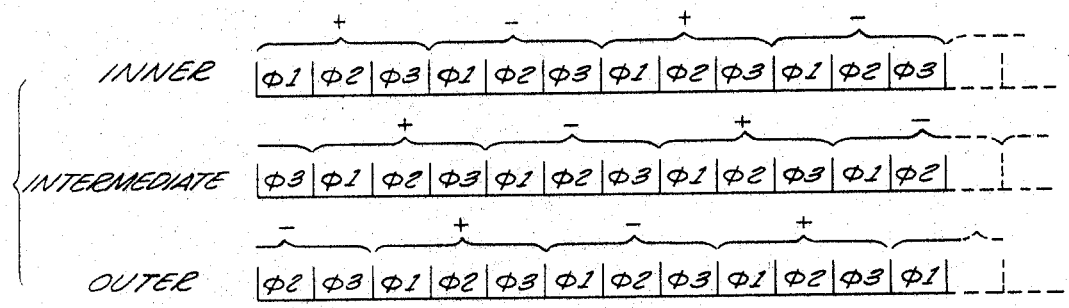
FIG. 11 shows an arrangement of a three phase, three layer stator.

FIG. 11 shows an alternate embodiment of the invention where three layers of stator windings are in juxtaposition, each layer comprising three phases, in cooperative relation with a rotor winding, not shown. The respective phases of the three stators are to be connected as indicated by their polarities.

Figure 13:
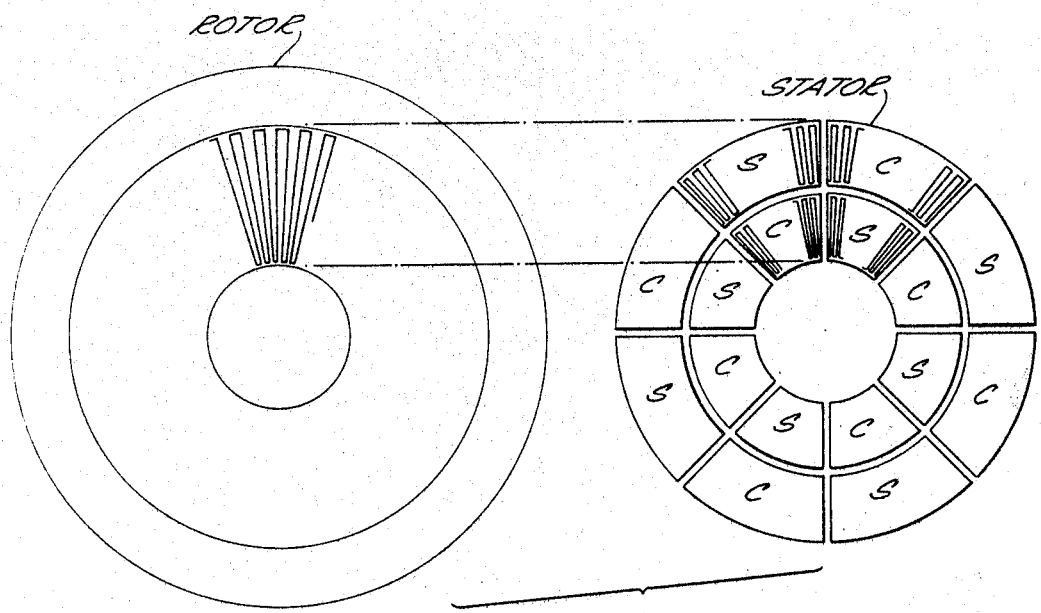
FIG. 13 is an exploded view of a modification showing a rotor and stator wherein the stator winding is in the form of several annuli in a single layer.

While the stators are shown in layers, they may, alternatively, be located in several annuli in a single layer, as shown in FIG. 13, and produce the same result. Further, the rotor may have a plurality of layers to cooperate with the pluralities of phases of the stators previously described, providing a position measuring transformer which will transmit all input phases, for example, with two stators and two rotor windings, produce a four winding resolver.

The arrangement of the rotor windings of FIG. 12, alternatively, may be used with single layer or multi-layer stators.

The arrangement of the windings of FIG. 12, suitably modified in linear form, may be used instead of the winding 33 of scale 30 of FIG. 7, providing a four terminal linear positioning transformer, using the stator windings of both layers of slider 34, or, alternatively, stator windings of only one layer.

Thus, it is obvious that many arrangements of layers and phases may be used without departing from the spirit of this invention.

I claim:

1. A position measuring transformer comprising
   (1) relatively movable transformer members,
   (2) one of said members having a multi-layer winding,
      (a) each layer comprisng a plurality of staggered groups of windings having a cofunction significance with said groups of each layer having intervening gaps; and
      (b) the windings of one significance of each layer arranged in the gaps of the groups of the associated significance,
   (3) the groups of one layer of one significance being opposite the groups of another significance in another layer,
   (4) the opposite groups of said layers having active conductors positioned in quadrature relation and being noninductively related to each other,
   (5) said transformer having another member having a winding inductively related to said multi-layer winding.

2. A position measuring transformer according to claim 1, the windings of all of said layers of the same sig-significance of all of said layers as a whole presenting substantially the appearance of a continuous winding in a direction facing said other transformer member.

3. A position measuring transformer according to claim 1, the windings of all of said layers of the same significance being connected in series aiding in a separate circuit for the windings of each significance.

4. A position measuring transformer comprising
   (1) relatively movable transformer members,
   (2) one of said members having multi-layers of inter-digitated groups of cofunction windings,
   (3) the winding groups of one cofunction significance of one layer being offset out of juxtaposition with the winding groups of the same significance in another layer,
   (4) the windings of all of said layers of the same significance being connected in series aiding.
   (5) said transformer having another member having a winding inductively related to said multi-layer winding.

5. A position measuring transformer comprising
   (1) relatively movable transformer members,
   (2) one of said members having multi-layers of groups of cofunction windings,
   (3) the winding groups of one cofunction significance in one layer being juxtaposed in quadrature relation with the winding groups of another cofunction significance in another layer, whereby,
   (4) the windings of one cofunction are in noninductive relation to the windings of the other cofunction,
   (5) said transformer having another member having a winding inductively related to said multi-layer winding.

6. A position measuring transformer comprising
   (1) relatively movable transformer members,
   (2) one of said members having multi-layers of groups of cofunction windings,
   (3) the winding groups of one cofunction significance of one layer being juxtaposed in quadrature relation with the winding groups of another cofunction significance in another layer,
   (4) the windings of one cofunction of said layers being connected in series aiding,
   (5) said transformer having another member having a winding inductively related to said multi-layer winding.

7. A position measuring transformer comprising
   (1) relatively movable transformer members,
   (2) one of said members having a multi-layer winding,
      (a) each layer comprising staggered groups of windings having a cofunction significance with said groups having intervening gaps, and
      (b) the windings of one cofunction significance of each layer arranged in the gaps of the groups of the associated significance,
   (3) the groups of one significance of one layer being opposite the groups of another significance in another layer,
   (4) said transformer having another member having a winding inductively related to said multi-layer winding.

8. A position measuring transformer comprising
   (1) relatively rotatable rotor and stator transformer members,
   (2) said stator member having multi-layers of inter-digited groups of cofunction windings,
   (3) the winding groups of one cofunction significance of one layer being juxtaposed with the winding groups of another significance in another layer,
   (4) said rotor having a cooperating winding of substantially less radial length than the radial length of said stator windings,
   (5) said rotor and stator windings being inductively related and each extending transversely of the direction of relative rotation of said rotor and stator.

9. A position measuring transformer comprisng
   (1) relatively movable transformer members,
   (2) one of said members having multi-layers of inter-digitated groups of cofunction windings,
   (3) the winding groups of one cofunction significance of one layer being juxtaposed with the winding groups of another significance in another layer,
   (4) another member having a coperating winding, inductively related to said multi-layer winding,
   (5) the windings of said one member and said other member having active conductor portions extending in a direction transversely of the direction of relative movement of said members,
   (6) the length of said multi-layer windings in said transverse direction being greater than the length of the winding of said other member in said transverse direction.

10. A position measuring transformer comprising
    (1) relatively movable members, (2) one member having a plurality of arrays of cofunction windings,
(3) the windings of one cofunction significance of one array being juxtaposed and coupled to the windings of another cofunction significance in another array,
(4) the windings of one cofunction significance of one array being in quadrature and noninductive relation to the windings of the other cofunction significance in another array.
(5) another member of said transformer having a winding inductively related to said plurality of arrays of cofunction windings.

11. A position measuring transformer in accordance with claim 10,
(1) the windings of the other member being shorter in the direction transverse to movement than the windings of the first member, the windings of all of said arrays of the same significance being connected in series aiding.

12. A position measuring transformer comprising relatively movable members,
(1) one of said members having multi-layers of cofunction windings,
(2) a winding of one cofunction of one layer being juxtaposed with a winding of another cofunction in another layer,
(3) said transformer having another member having a winding inductively related to said multi-layer winding.

13. A position measuring transformer according to claim 12, the winding of said other member having a single layer.

14. A position measuring transformer according to claim 12, the winding of said other member having a multi-layer of cofunction windings, one cofunction winding of one significance being juxtaposed with a cofunction winding of another significance.

15. A position measuring transformer according to claim 12, where said multi-layers are at least three in number, said one cofunction winding being juxtaposed with at least two of the other cofunction windings.

16. A position measuring transformer according to claim 12, where the cofunction windings are in quadrature relation.

17. A position measuring transformer according to claim 12, the winding of said other member having single layer cofunction windings.

18. A position measuring transformer according to claim 12, the windings of one cofunction significance in one layer being offset in noninductive relation with the windings of the other cofunction significance.

19. A position measuring transformer comprising
(1) relatively movable members,
(2) one of said members having two layers of groups of cofunction sine and cosine windings,
(3) one cofunction winding of one significance in one layer being juxtaposed with the other cofunction winding of another significance in the other layer,
(4) said transformer having another member having a winding inductively related to said multi-layer winding.

20. A position measuring transformer according to claim 19, the groups of cofunction windings of one significance in one layer being offset to provide noninductive relation between the cofunction windings of the two layers.

21. A position measuring transformer comprising
(1) relatively movable members,
(2) one of said members having arrays of cofunction windings, each array comprising at least two groups,
(3) the windings, of one cofunction significance of one array being juxtaposed with the winding of another cofunction significance in another array,
(4) the groups of each cofunction winding in one array being offset from the other array to provide noninductive relation between the arrays of cofunction windings,
(5) said transformer having another member having a winding inductively related to the windings of said arrays.

22. A position measuring transformer comprising
(1) relatively movable members,
(2) each of said members having arrays of cofunction windings, each array comprising at least two groups,
(3) the windings of one cofunction significance of each member being juxtaposed with the winding of the other cofunction significance, on that member,
(4) the groups of each cofunction winding of an array being offset from the groups of another array on the same member to provide noninductive relation between the cofunction windings of the arrays on each member,
(5) the windings of one of said transformer members being inductively related to the windings of the other transformer member.

23. A position measuring transformer comprising
(1) relatively movable transformer members,
(2) one of said members having a multi-array winding,
   (a) each array comprising a plurality of staggered groups of windings having a cofunction significance with said groups of each array having intervening gaps; and
   (b) the windings of one significance of each array arranged in the gaps of the groups of the associated significance,
(3) the groups of one array of one significance being opposite the groups of another significance in another array,
(4) the opposite groups of said arrays having active conductors positioned in quadrature relation and noninductively related to each other,
(5) said transformer having another member having a winding inductively related to said multi-array winding.

References Cited

UNITED STATES PATENTS

| | | | |
|---|---|---|---|
| 2,799,835 | 7/1957 | Tripp et al. | 336—123 |
| 2,994,051 | 7/1961 | Spencer et al. | 336—115 |
| 3,148,347 | 9/1964 | Morrison | 336—123 |
| 3,264,588 | 8/1966 | Winget | 336—123 XR |

LEWIS H. MYERS, *Primary Examiner.*

T. J. KOZMA, *Assistant Examiner.*

U.S. Cl. X.R.

336—129